(No Model.)

A. M. WADDILL, Jr.
INSECT POWDER DISTRIBUTER.

No. 445,482. Patented Jan. 27, 1891.

WITNESSES:
Francis McArdle
C. Sedgwick

INVENTOR:
A. M. Waddill Jr.
BY Munn & Co.
ATTORNEYS

UNITED STATES PATENT OFFICE.

ANDY M. WADDILL, JR., OF THOMASTOWN, LOUISIANA.

INSECT-POWDER DISTRIBUTER.

SPECIFICATION forming part of Letters Patent No. 445,482, dated January 27, 1891.

Application filed June 18, 1890. Serial No. 355,882. (No model.)

*To all whom it may concern:*

Be it known that I, ANDY M. WADDILL, Jr., of Huon Store, (Thomastown P. O.,) in the parish of Madison and State of Louisiana, have invented a new and Improved Insect-Powder Distributer, of which the following is a full, clear, and exact description.

The object of the invention is to provide a new and improved insect-powder distributer which is simple and durable in construction and specially designed to conveniently and quickly dust cotton or other plants with a poisonous powder to prevent ravages by insects.

The invention consists of a frame and a powder-box extending through and supported in the frame by springs.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
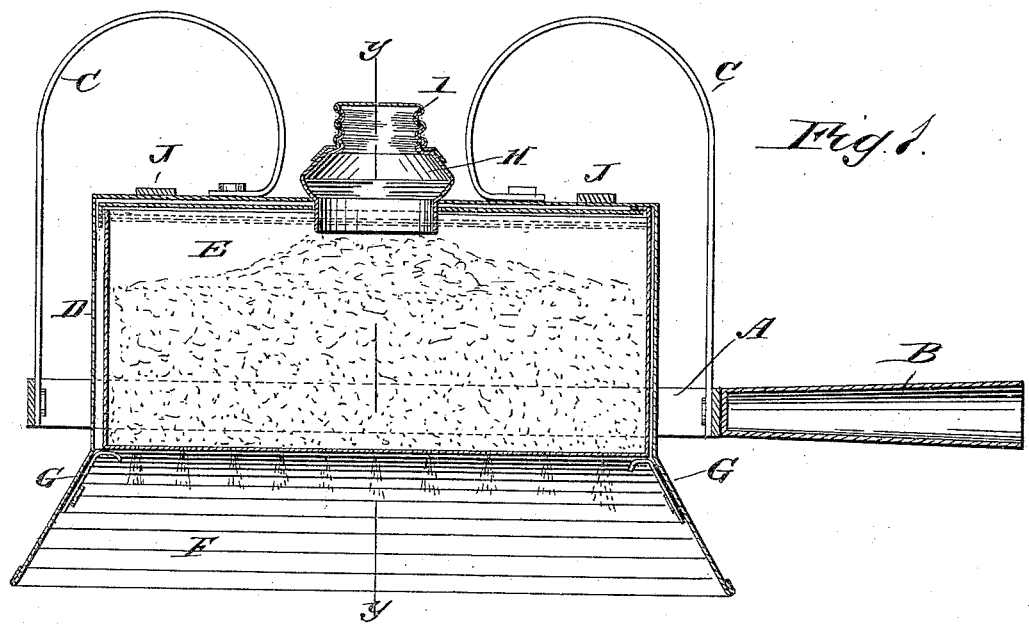
Figure 2:
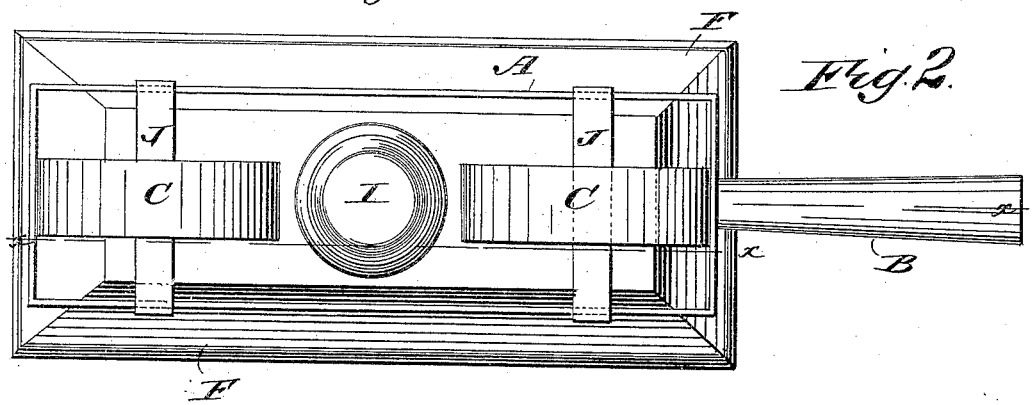
Figure 3:
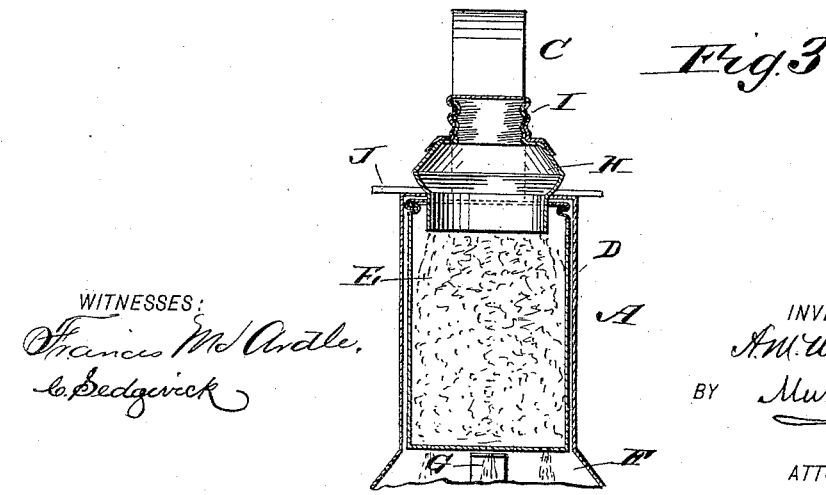

Figure 1 is a sectional side elevation of the improvement on the line $x\,x$ of Fig. 2. Fig. 2 is a plan view of the same; and Fig. 3 is a transverse section of same on the line $y\,y$ of Fig. 1.

The improved insect-powder distributer is provided with a rectangular open frame A, on one end of which is fastened a handle B, by which the device can be conveniently carried about and placed over the plants to be dusted with a poisonous powder, in the manner hereinafter described. On the ends of the rectangular frame A are also fastened springs C, extending upward and curved inward at their upper ends in about the form of a semicircle, the inner ends being fastened by rivets or other means to the top of a casing D, within which is located a box E, having a perforated bottom and adapted to contain a poisonous powder.

The casing D is open at its bottom, and is provided at its lower end with an outwardly-flaring hood F, located below the perforated bottom of the powder-box E. The latter is held in place within the casing D by suitable catches G, pivoted to the sides of the hood F, and adapted to be swung downward so as to conveniently remove the powder-box E whenever desired.

In the top of the casing D is arranged an inlet-spout H, projecting inward and adapted to pass through a suitable opening in the top of the powder-box E, so that the latter can be filled from the outside without removing it from the casing D. A cap I is adapted to close the outer end of the inlet H. On the top of the casing D are also arranged transversely-extended bars J, projecting a suitable distance at each side of the casing and serving to strike against a fixed object, so as to shake the powder contained in the box E.

The device is used as follows: The powder-box E is filled with insect-powder and is held within the casing D, with the perforated bottom downward and opening into the hood F. The operator takes hold of the handle B, so as to conveniently guide or hold the hood F over the plant to be dusted with the powder contained in the box E, and then the operator, by giving the handle a slight shaking motion, causes the casing D to swing within the frame A, striking with its ends or sides on the ends or sides of the frame, whereby the powder in the box E is shaken and readily passes through the perforations in the bottom of the box and onto the plants located below the hood F.

As the casing D and the box E are yieldingly mounted in the frame A, they are in constant motion, so that a thorough dusting of the plants takes place. It will be seen that the powder is prevented by the downwardly-extending hood F from flying in all directions, and is more particularly guided to the plants.

Having thus described my invention, what I claim as new, and desire to secure by Letters Patent, is—

1. In an insect-powder distributer, the combination, with a frame, of springs secured to the said frame, and a powder-box connected with the said springs and extending through the said frame, substantially as shown and described.

2. In an insect-powder distributer, the combination, with a handled frame, of springs secured to the ends of the said frame, a casing connected with the said springs and arranged within the said frame, and a powder-box held in the said casing and having a perforated bottom, substantially as shown and described.

3. In an insect-powder distributer, the combination, with a handled frame, of springs secured to the ends of the said frame, a casing connected with the said springs and arranged within the said frame, a powder-box held in the said casing and having a perforated bottom, and an outwardly-flaring hood arranged on the lower end of the said casing below the bottom of the said powder-box, substantially as shown and described.

4. In an insect-powder distributer, the combination, with a handled frame, of springs secured to the ends of the said frame, a casing connected with the said springs and arranged within the said frame, a powder-box held in the said casing and having a perforated bottom, and an inlet arranged in the said casing and opening into the said powder-box, substantially as shown and described.

5. In an insect-powder distributer, the combination, with a handled frame, of springs secured to the ends of the said frame, a casing connected with the said springs and arranged within the said frame, a powder-box held in the said casing and having a perforated bottom, an inlet arranged in the said casing and opening into the said powder-box, and a cap for closing the said inlet, substantially as shown and described.

ANDY M. WADDILL, Jr.

Witnesses:
A. L. SLACK,
E. C. MONTGOMERY.